US008793238B1

(12) United States Patent
Carver et al.

(10) Patent No.: US 8,793,238 B1
(45) Date of Patent: *Jul. 29, 2014

(54) ORGANIZATION SYSTEM FOR AD CAMPAIGNS

(71) Applicant: Google Inc., Mountain View, CA (US)

(72) Inventors: Anton Carver, London (GB); Will Ashton, London (GB); Nick Jakobi, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/759,356

(22) Filed: Feb. 5, 2013

Related U.S. Application Data

(63) Continuation of application No. 13/466,344, filed on May 8, 2012, now Pat. No. 8,392,396, which is a continuation of application No. 11/962,021, filed on Dec. 20, 2007, now Pat. No. 8,180,760.

(51) Int. Cl.
G06F 17/30 (2006.01)

(52) U.S. Cl.
USPC ........................................................ 707/708

(58) Field of Classification Search
USPC ........................................................ 707/708
See application file for complete search history.

(56) References Cited

U.S. PATENT DOCUMENTS

| 5,724,521 | A | 3/1998 | Dedrick |
| 5,740,549 | A | 4/1998 | Reilly et al. |
| 5,848,397 | A | 12/1998 | Marsh et al. |
| 5,948,061 | A | 9/1999 | Merriman et al. |
| 6,026,368 | A | 2/2000 | Brown et al. |
| 6,044,376 | A | 3/2000 | Kurtzman, II |
| 6,078,914 | A | 6/2000 | Redfern |
| 6,144,944 | A | 11/2000 | Kurtzman, II et al. |
| 6,167,382 | A | 12/2000 | Sparks et al. |
| 6,269,361 | B1 | 7/2001 | Davis et al. |
| 6,401,075 | B1 | 6/2002 | Mason et al. |
| 6,523,026 | B1 | 2/2003 | Gillis |
| 6,985,882 | B1 | 1/2006 | Del |
| 7,039,599 | B2 | 5/2006 | Merriman et al. |
| 7,136,875 | B2 | 11/2006 | Anderson et al. |
| 2002/0152201 | A1 | 10/2002 | Nanavati et al. |
| 2004/0186920 | A1 | 9/2004 | Birdwell et al. |
| 2007/0271226 | A1 | 11/2007 | Zhang et al. |
| 2008/0288328 | A1 | 11/2008 | Minor et al. |

FOREIGN PATENT DOCUMENTS

WO          WO9721183 A1       6/1997

OTHER PUBLICATIONS

Mitra Basu, Data Complexity in Pattern Recognition, 2006, pp. 223-224.*
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.

(Continued)

Primary Examiner — Amresh Singh
(74) Attorney, Agent, or Firm — Fish & Richardson P.C.

(57) ABSTRACT

An automatic account organization tool is provided to organize a large adgroup into smaller adgroups with semantically meaningful names. For example, a set of input keywords is received, semantically related pairs of keywords are identified from the set of input keywords, and hierarchical clustering is applied to the pairs of keywords to identify a set of clusters of keywords, each cluster having semantically related keywords. A name can be determined for each of the clusters.

17 Claims, 11 Drawing Sheets

(56) References Cited

OTHER PUBLICATIONS

AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.
Data complexity in Pattern Recognition, Mitra Basu, 2006, Spring.com-Verlag London, Chapter (11.4.3, pp. 1-3).
The Data Mining and Knowledge Discovery handbook, Oded Maimom, 2005, Springer Science+Business Media, Inc., pp. 330-333).
McCallum et al. "Efficient Clustering of High-Dimensional Data Sets with Application to Reference Matching" [online] retrieved on Aug. 16, 2011 Retrieved from the Internet electronic mail: http://www.kamalnigam.com/papers/canopy-kdd00.pdf.
Dedrick, R., A Consumption Model for Targeted Electronic Advertising, Intel Architecture Labs, IEEE, 1995.

\* cited by examiner

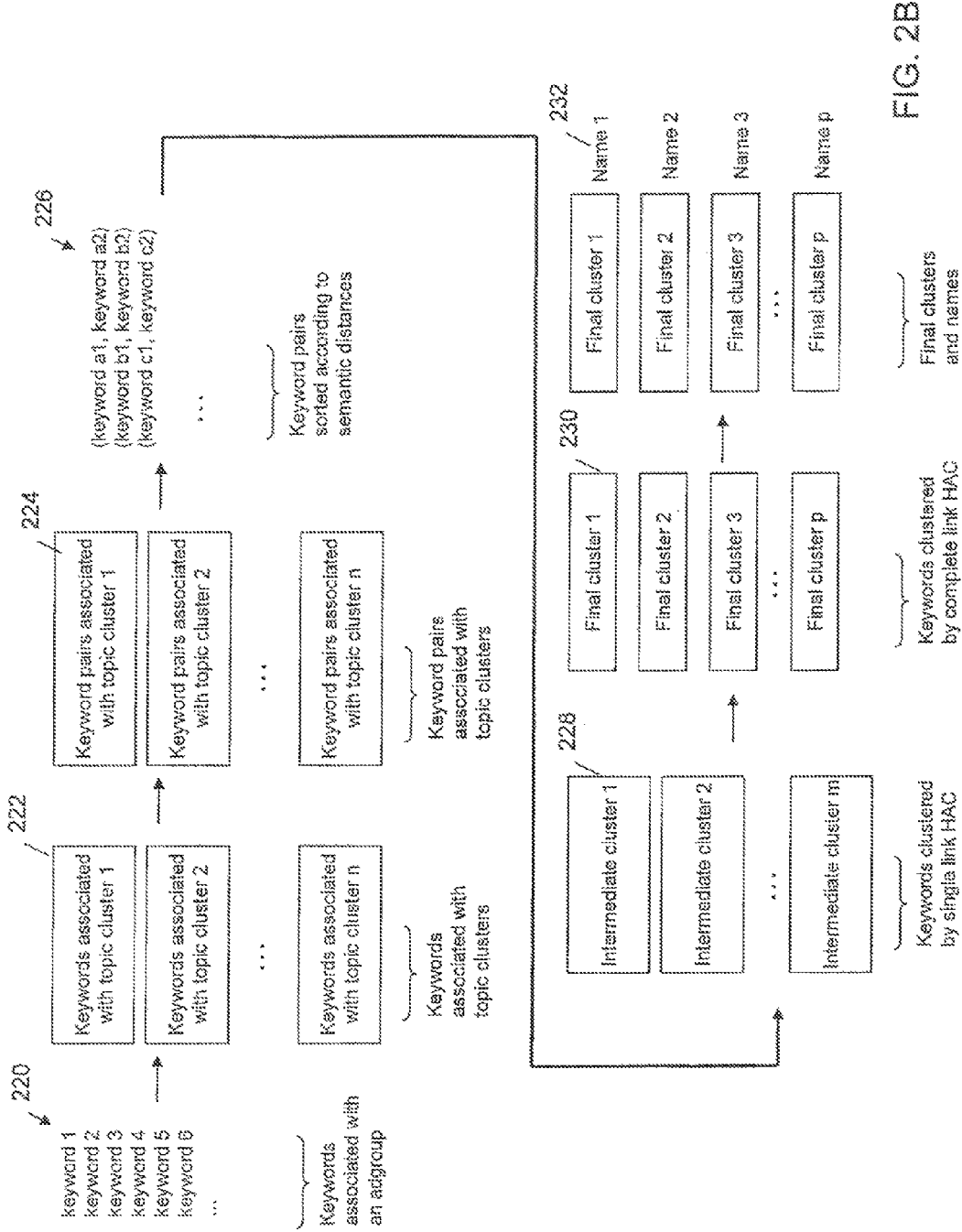

|  | Topic Cluster | | | | | | | | | |
|---|---|---|---|---|---|---|---|---|---|---|
| Keyword | 1 | 2 | 3 | 4 | 5 | 6 | 7 | 8 | 9 | 10 |
| 1 | x |   |   |   |   |   |   |   |   |   |
| 2 | x |   |   |   |   |   |   |   |   | x |
| 3 |   | x | x |   |   |   |   |   |   |   |
| 4 |   |   |   |   | x |   |   |   |   | x |
| 5 | x |   |   |   |   |   |   |   |   |   |
| 6 |   |   |   | x |   |   |   |   |   |   |
| 7 |   | x |   | x |   |   |   |   |   |   |
| 8 |   |   |   | x |   |   |   |   |   |   |
| 9 |   |   |   |   |   | x |   |   |   | x |
| 10 |   |   |   |   |   |   | x | x |   |   |
| 11 |   |   |   |   |   |   | x |   |   | x |
| 12 |   | x |   |   |   |   |   |   |   |   |
| 13 |   |   |   |   |   |   |   | x | x |   |
| 14 | x |   |   |   |   |   |   |   |   |   |
| 15 |   |   |   |   | x |   |   |   |   |   |
| 16 |   |   |   |   |   | x |   |   |   |   |
| 17 |   | x |   | x |   |   |   | x | x |   |
| 18 |   |   |   |   |   |   |   |   |   |   |
| 19 |   |   | x |   |   |   |   |   |   |   |
| 20 |   |   |   |   |   |   |   |   |   |   |

FIG. 4

Input Keywords — 730 cheap auto cover quotations
cheap house insurance quotes
apply credit card
stocks isa
women vehicle cover
low cost vehicle cover quotation
fully comp car cover
cheaper property cover quote
highest interest saving accounts
green investments strategies
lower buildings insurance quote
saving accounts children
discount insurance for homes
cheap house insurance quotation
van cover for males
low cost building & contents cover
low driving cover quotation
first time buyer home loan rate
cheaper homeowners insurance
cheap apr credit card
buy buildings assurance
auto cover for female
home insurance rate uk
cheaper buildings insurance
van insurance price
maxi isas interest
cheap buildings and contents cover
comparing mortgages quotes
insure motor
ladys cover
building content assurance
low cost house cover
buildings & contents insurance quotations
3 party car protection
house insurance online quote
affordable flat cover quote
brand van insuranse
discounted vehicle cover quote
buildings and contents assurance quotations
flexible savings accounts
uk house cover quotation
banks savings accounts
cheap home owners assurance
renter insurance
brand van cover
low cost homeowners cover quotation
brand van insurense
lower content assurance quotations
affordable home assurance
men cover
1 cash back creditcards
instant house insurance quote
mini isas online cheap home owners insurance quotation
dividend fund markets
affordable contents cover quotation
lower property assurance quotes
third party auto cover
low buildings insurance
buy to let mortgage calculator
low van cover quote
low cost homeowner cover
stocks and share isa rate
brand investment
discount homeowner insurance
flexible savings uk
discount homeowner cover quotations
discount flat cover
apply mortgage
house cover house cover quote
quotations insurance
discount building insurance
saving accounts rates
japan fund strategy
free online home insurance quotation
share uk isas
building content assurance quotes
blue chip fund strategy
mortgage calculations
fast home cover quotations
students saving uk
cheap auto insurance quotations
emerging market funds markets
low cost buildings contents
lowest buildings and contents
cheaper property cover
house buildings assurance
home cover quotations uk
cheapest home insurance quote uk
home cover in uk
searching for remortgage
free online house assurance quotations
benefit mastercard
cheaper building insurance quotation
tenant possessions assurance
best rate saving account
brand credit cards
lower buildings insurance quotations
mortgage centre
student savings uk

FIG. 8

Final Clusters Determined From Input Keywords

740 {
Cluster name: Auto Insurance
Keywords: cheaper buildings insurance, cheap auto insurance quotations, cheaper property cover quote, buildings and contents assurance quotations, cheap home owners insurance quotation, low cost building & contents cover, cheaper building insurance quotation, low cost vehicle cover quotation, lower buildings insurance quotations 740 {
Cluster name: Home Insurance 1
Keywords: renter insurance, discount homeowner insurance 740 {
Cluster name: Home Insurance 2
Keywords: instant house insurance quote, house insurance online quote, lower buildings insurance quote, cheap house insurance quotation, cheap buildings and contents cover, cheap house insurance quotes, cheapest home insurance quote uk Cluster name: Home Financing
Keywords: apply mortgage, first time buyer home loan rate Cluster name: Finance & Investing
Keywords: dividend fund markets, blue chip fund strategy Cluster name: Personal Finance 1
Keywords: best rate saving account, maxi isas interest, stocks and share isa rate, saving accounts rates, highest interest saving accounts Cluster name: Credit Cards
Keywords: 1 cash back creditcards, apply credit card Cluster name: Personal Finance 2
Keywords: banks savings accounts, flexible savings accounts

FIG. 9

ORGANIZATION SYSTEM FOR AD CAMPAIGNS

CROSS-REFERENCE TO RELATED APPLICATIONS

This application is a continuation application of, and claims priority to, U.S. patent application Ser. No. 13/466,344, entitled "ORGANIZATION SYSTEM FOR AD CAMPAIGNS", to inventors Anton Carver et al., which was filed on May 8, 2012, which is a continuation application of, and claims priority to, U.S. patent application Ser. No. 11/962,021, entitled "ORGANIZATION SYSTEM FOR AD CAMPAIGNS", to inventors Anton Carver et al., which was filed on Dec. 20, 2007 and issued as U.S. Pat. No. 8,180,760. The disclosure of the foregoing applications is incorporated herein by reference in their entirety.

TECHNICAL FIELD

This document generally relates to information management.

BACKGROUND

On-line advertisements ("ads") allow advertisers to reach a wide range of viewers through the Internet. The selection of ads for presentation (e.g., display), such as with search results and other information, and the ordering of those advertisements, may be achieved by various techniques. In one example technique, an initial determination is made to identify all advertisements that are a match or near match for applied search terms or other query items or information. The match may be made, for example, between one or more words in a query, and keywords identified by an advertiser and associated with a particular advertisement or group of advertisements, such as a campaign.

For example, a company selling fishing tackle may have a line of large lures, and may thus identify terms such as "lunker," "sturgeon," and "muskie fever" as keywords to associate with their advertisements for such large lures. Those advertisements may then be considered by the system for display when search results are displayed to a user who enters such terms. An advertisement may be selected for possible display if there is a "near" match also, for example, if a query includes terms that are known synonyms or mistypings/misspellings of the keyword terms for an advertisement. Some sponsors of the advertisements may associate several (e.g., dozens or hundreds) keywords with each of the advertisements.

SUMMARY

This document describes an automatic account organization tool to organize keywords in large ad campaigns. In one aspect, in general, an automatic account organization tool is provided to receive an input list of keywords and output keywords that are organized into adgroups with semantically meaningful names.

Implementations may include one or more of the following features. The account organization tool can use a semantic database to classify the input keywords into initial clusters based on predefined topic clusters in the semantic database and can generate a reverse mapping from the initial clusters to the input keywords. Pairs of keywords that share at least one initial cluster can be identified, duplicate pairs of keywords can be removed, keyword pairs having a distance above a threshold can be removed, and the keyword pairs can be sorted according to semantic distance.

A single link hierarchical agglomerative clustering (HAC) algorithm can be applied to the list of pairs of keywords to form single link clusters where each keyword is linked to another keyword if the two keywords belong to a pair and the distance between the two keywords is less than a threshold. A complete link HAC algorithm can be applied to each of the single link clusters, in which the distance of all pairs within the cluster is calculated and a keyword remains in the cluster when its distance to every other keyword in that cluster is less than a threshold. Otherwise, the keyword can be removed from the original single link cluster and added to another cluster or used to start a new cluster. An ad group name can be generated for each cluster. Each of the final clusters can include semantically related keywords that can be associated with an individual ad group.

In general, in another aspect, a set of input keywords is received; semantically related pairs of keywords are identified from the set of input keywords; and hierarchical clustering is applied to the pairs of keywords to identify a set of clusters of keywords, each cluster having semantically related keywords.

Implementations may include one or more of the following features. The set of input keywords can be grouped based on common classifications to form groups of keywords. Identifying semantically related pairs of keywords can include identifying semantically related pairs of keywords within each group of keywords. Duplicate pairs of keywords can be removed. Grouping the set of input keywords based on common classifications can include grouping the plurality of keywords based on predetermined classifications specified in a semantic database. Grouping the plurality of keywords based on predetermined classifications specified in a semantic database can include, for each of the keywords, identifying one or more classifications in the semantic database that are associated with the keyword. Grouping the plurality of keywords based on predetermined classifications can include, for each of the identified classifications, identifying keywords that are associated with the classifications.

Applying the hierarchical clustering can include applying single link hierarchical clustering to the pairs of keywords to generate a set of intermediate clusters. Applying the single link hierarchical clustering can include joining a keyword to an intermediate cluster if the keyword and another keyword in the intermediate cluster belong to a pair. Applying the single link hierarchical clustering can include joining the keyword to the intermediate cluster if a semantic distance between the keyword a second (i.e., the other) keyword is less than a threshold. Applying the hierarchical clustering can include, for each intermediate cluster, applying complete link hierarchical clustering to the keywords in the intermediate cluster to generate one or more clusters of keywords. Applying the complete link hierarchical clustering to the keywords in the intermediate cluster can include determining a semantic distance for every pair of keywords in the intermediate cluster. Applying the complete link hierarchical clustering can include removing a keyword from an intermediate cluster if the semantic distance between the keyword and any other keyword in the intermediate cluster is above a threshold. Applying the complete link hierarchical clustering to the intermediate clusters can be performed in parallel.

A semantic distance can be determined for each pair of keywords and the pairs of keywords can be sorted according to the semantic distances prior to applying the hierarchical clustering. Determining the semantic distance for each pair of keywords can include determining classifications of a semantic database that are associated with the keywords and scores that measure how strongly related the keywords are to the classifications, and determining the distance for the pair of keywords based on the classifications and the scores. A name can be identified for each of the clusters.

In general, in another aspect, a plurality of keywords are received; semantic distances of selected pairs of keywords are determined, the selected pairs being less than all pairs of keywords; intermediate clusters of keywords are formed by clustering the keywords based on the pairing relationships of the keywords; semantic distances of all pairs of keywords within each intermediate cluster are determined; and final clusters of keywords are formed by clustering the keywords within each intermediate cluster based on the semantic distances of the keywords.

Implementations may include one or more of the following features. The plurality of keywords can be grouped based on common classifications and pairs of keywords that are associated with the same group are selected. Grouping the plurality of keywords based on common classifications can include grouping the plurality of keywords based on predetermined classifications specified in a semantic database. Forming intermediate clusters of keywords by clustering the keywords based on the pairing relationships of the keywords can include applying single link hierarchical clustering to the selected pairs of keywords. Forming clusters of keywords can include applying complete link hierarchical clustering to the keywords within each intermediate cluster. A name can be identified for each of the clusters.

In general, in another aspect, a semantic database has information about common classifications of keywords; a pairing engine identifies semantically related pairs of keywords from a set of input keywords; and a hierarchical clustering engine applies hierarchical clustering to the pairs of keywords to generate a clusters of keywords.

Implementations may include one or more of the following features. A semantic database server can query the semantic database to provide information about which common classifications are associated with a given keyword, and scores indicating strengths of associations between the keyword and the common classifications. The pairing engine can include a classifier to group the input keywords into initial groups of keywords, each initial group being associated with one of the common classifications. The pairing engine can include a filter to remove pairs of keywords in which the semantic distance between the keywords of each pair is greater than a threshold. The pairing engine can include a sorter to sort the pairs of keywords in a sequence according to semantic distances of the keyword pairs. The hierarchical clustering engine can include a single link hierarchical agglomerative clustering engine to cluster the keywords based on single link hierarchical agglomerative clustering. The hierarchical clustering engine can include a complete link hierarchical agglomerative clustering engine to cluster the keywords based on complete link hierarchical agglomerative clustering. A naming engine can generate a name for each cluster of keywords generated by the hierarchical clustering engine.

In general, in another aspect, an apparatus includes means for storing information about common classifications of keywords; means for identifying semantically related pairs of keywords from a set of input keywords; and means for applying hierarchical clustering to the pairs of keywords to generate a clusters of keywords.

These and other aspects and features, and combinations of them, may be expressed as methods, apparatus, systems, means for performing functions, program products, and in other ways.

Advantages of the aspects and features include one or more of the following. Performance of a large ad campaign can be improved by forming groups of keywords that are semantically related. On-line ads can be targeted more accurately based on matching between ad keywords and contents of web documents. Ads can be shown to people who feel that the ads are relevant to the information that they are looking for. Ad click-through rates and conversion rates can be improved. Users' on-line experiences can be improved. More ad revenue can be generated for advertisers and publishers. A large number of ad campaigns can be analyzed and improved efficiently.

The details of one or more embodiments are set forth in the accompanying drawings and the description below. Other features, objects, and advantages of the invention will be apparent from the description and drawings, and from the claims.

DESCRIPTION OF DRAWINGS

FIG. 2B is a diagram showing processing of keywords in various stages.

FIG. 4 is an example table showing a relationship between keywords and topic clusters.

FIG. 8 shows an example of a list of input keywords.

FIG. 9 shows an example of final clusters of the keywords.

Like reference symbols in the various drawings indicate like elements.

DETAILED DESCRIPTION

Figure 1:
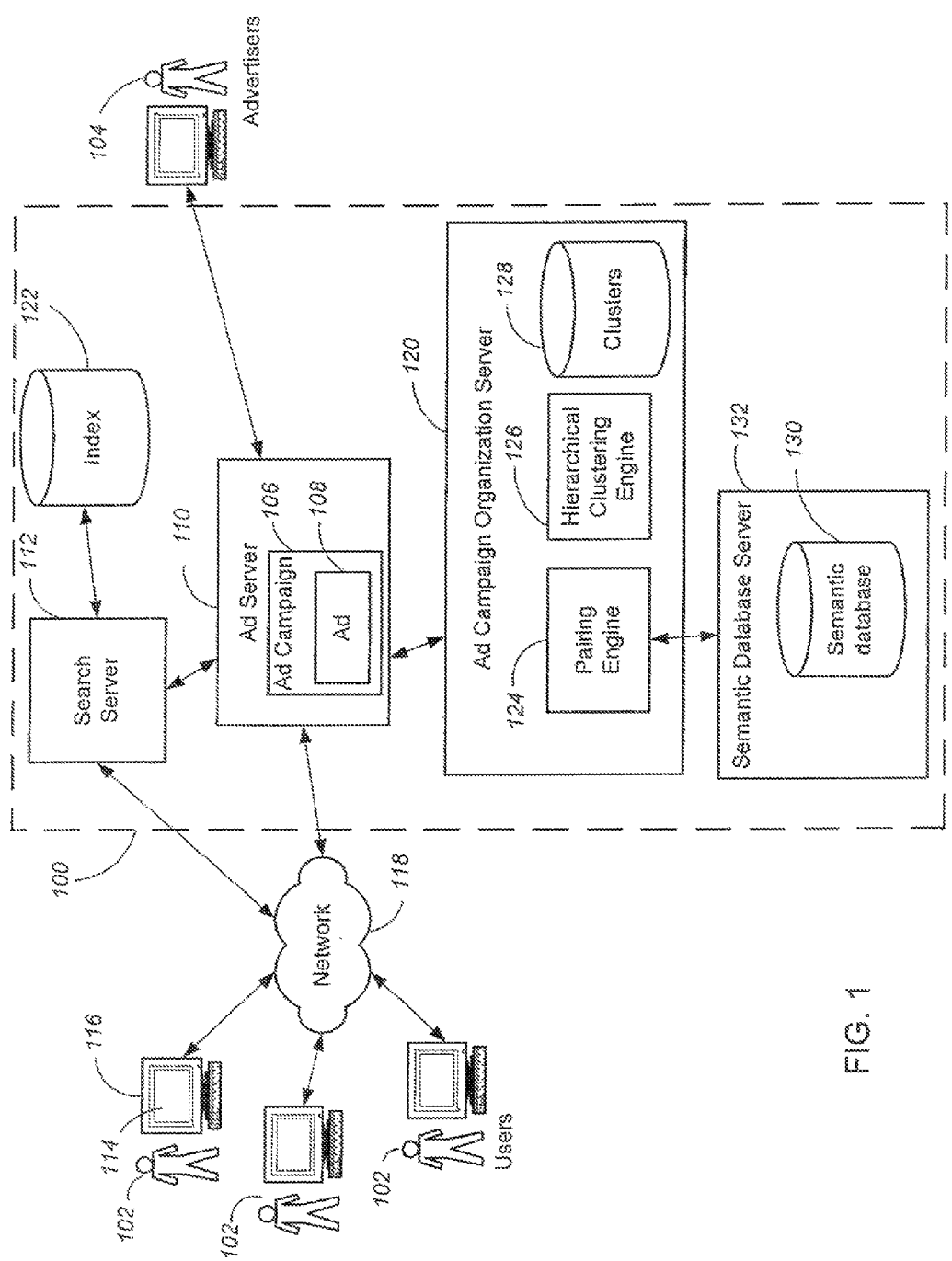
FIG. 1 is a schematic diagram of an example information retrieval system.

FIG. 1 is a schematic diagram of an example information retrieval system 100 for retrieving and displaying information, such as web documents, that match search queries submitted by users 102. The system 100 may deliver ads 108 along with the documents, in which the ads 108 match the content of the documents. The system 100 provides suggestions to advertisers 104 (sponsors of the ads) on structures of ad campaigns 106 hosted on an ad server 110. For example, an ad campaign 106 is initially associated with a group of keywords such that ads 108 of the campaign 106 are delivered when contents of documents match those keywords. The system 100 analyzes the group of keywords and may group them into two or more clusters each having a smaller number of keywords such that the keywords within a cluster have a higher level of semantic similarity to one another than the original larger group.

By grouping the large number of keywords into clusters each having a smaller number of keywords, the ads 108 can be targeted more accurately, potentially generating more revenue to the advertisers 104 and publishers of web pages that include the ads 108. For example, ad keywords can be more closely matched with web documents so that the ads 108 can be shown to people who feel that the ads 108 are relevant to the information (e.g., the web documents) that they are looking for, and hence are more likely to click on or otherwise act upon the ads 108. The system 100 can automatically analyze a large number of ad campaigns and group the keywords of each ad campaign, if feasible, into smaller clusters so that a large number of ad campaigns can be improved efficiently.

For example, the advertisers 104 can also set up the ad campaigns 106 such that each ad campaign 106 is initially associated with a group of keywords, and the system 100 delivers the ads 108 of the campaign 106 when search queries match those keywords. By grouping the large number of keywords into clusters each having a smaller number of keywords, ad keywords can be more closely matched with search query keywords submitted by the users 102, so that the ads 108 can be targeted more accurately.

In this description, the term "keyword" can mean one or more words, such as phrases. Each phrase can include two or more words. For example, when an ad is associated with "car" and "hybrid vehicle", each of "car" and "hybrid vehicle" is referred to as a keyword associated with the ad. Similarly, a "search keyword" can mean one or more words in a search query. When a user submits a search query looking for information about "pie" and "apple sauce", each of "pie" and "apple sauce" is referred to as a search keyword in the search query.

The system 100 includes a search server 112 that enables the users 102 to search for information using a keyword search. The user 102 uses a web browser 114 executing on a client machine 116 (e.g., personal computer or a mobile phone) to access the search server 112 through a network 118 (e.g., Internet). The user 102 sends a search request that includes a search query to the search server 112, in which the search query includes one or more search terms. In response, the search server 112 searches an index 122, returns a list of pages that match the search query submitted by the user 102, and provides the list of pages in a sequence, for example, according to rank scores of the pages. The search server 112 also causes ads 108 to be displayed alongside the list of returned pages. Other search configurations, content and methodologies are possible. While reference is made to delivering ads, system 100 can deliver other form of content including other forms of sponsored content.

The ad server 110 stores information about the ad campaigns 106. Each ad campaign 106 can include one or more ad groups, and each ad group can include one or more ads that are targeted to a group of keywords or websites. The ad campaign 106 includes metadata associated with the one or more ads. The metadata includes, for example, a group of keywords and information about budgets for ads, geographical locations for targeting the ads, languages for targeting the ads, web sites for targeting the ads, and end dates for the ads, etc.

The system 100 includes an ad campaign organization server 120 that analyzes the ad campaign 106 and provides suggestions on grouping of the keywords in the ad campaign 106. Upon receiving a request to optimize the ad campaign 106, the ad campaign organization server 120 analyzes the group of keywords associated with the ad campaign 106 and, if feasible, groups the keywords into two or more clusters that are more focused than the original group. The ad campaign organization server 120 also provides names for each of the clusters so that it is easier for the advertisers to identify the clusters. If the ad campaign 106 is already optimized, then no further grouping of the keywords is necessary.

In one implementation, the ad campaign organization server 120 includes a pairing engine 124, a hierarchical clustering engine 126, and a database 128 storing clusters of keywords. The pairing engine 124 identifies pairs of semantically related keywords based on information about relationships among the keywords, such as how closely related or opposite they are. The information can be obtained from a semantic database 130 maintained by a semantic database server 132. The semantic database server 132 can provide various kinds of information in the semantic database 130 that can be used to determine, for example, semantic distances that represent a measure of relationships among keywords.

For example, the semantic database server 132 and the semantic database 130 can be implemented using the technology described in U.S. patent application Ser. No. 10/676,571, titled "Method and Apparatus for Characterizing Documents Based on Clusters of Related Words," and U.S. Pat. No. 7,231,393, titled "Method and Apparatus for Learning a Probabilistic Generative Model for Text".

For example, the semantic database 130 can use Bayesian network models (e.g., noisy- or Bayesian network models) that represent keywords as nodes in a graph, and associations between keywords as edges in the graph. Probabilities or other scores can be assigned to each edge to indicate the degree of relationship between the two nodes associated with the edge. In general, keywords connected with edges having higher scores or probabilities have greater semantic similarities (or shorter semantic distances) than keywords connected with edges having lower scores.

In some implementations, the semantic database 130 includes predetermined topic clusters, each topic cluster including keywords that have certain relationships. Each topic cluster can be identified by a cluster number. Keywords that are associated with the same cluster numbers are more likely to be related in some way than keywords that do not share any common cluster numbers. Each keyword can be associated with one or more topic clusters.

When provided with a query keyword, the semantic database server 132 can provide a cluster vector representing a set of topic clusters (represented by their cluster numbers) associated with the keyword, and a set of "activation scores" (or "activation weights"). Each activation score indicates the strength of association between the keyword and one of the topic clusters. For example, a keyword "photo pixels" may have a higher activation score with respect to a topic cluster associated with "digital cameras" than a topic cluster associated with "fruits".

In this description, each of the predetermined clusters in the semantic database 130 is referred to as a "topic cluster", and the term "semantic cluster" is used to refer to the clusters that are generated by the ad campaign organization server 120 (e.g., using the pairing engine 124 and hierarchical clustering engine 126 described below).

When a large ad campaign is associated with a large number of ad keywords, the ad campaign may not perform well when on-line ads are selected based on a comparison of the ad keywords and on-line content. This is because for a large adgroup spanning multiple subjects, there may not be a good fit for any web page, so the adgroup may receive few impressions and less clicks. Larger adgroups also tend to have more general creatives that are less well targeted and have poorer performance.

By using the ad campaign organization server 120, the advertisers 104 can use the information about the clusters of keywords to improve the ad campaign 106. The advertiser 104 can accept the suggestions from the sever 120 regarding the clusters of keywords, upon which the server 120 automatically restructures the advertiser's ad campaign 106 to generate multiple smaller ad campaigns each associated with a smaller cluster of more closely related keywords. Alternatively, the advertiser 104 can further manually refine the grouping of keywords. Because the clusters of keywords have more focused themes than the original group, the matching of ads with documents or search queries can be improved, users 102 can receive more relevant ads, the conversion rates of the ads 108 can improve, and the advertisers 104 and publishers of web documents that include the ads 108 can receive more ad revenue.

The network 118 can be a local area network (LAN), a wide area network (WAN), the Internet, any other type of network, or any combination of types of networks.

Figure 2A:
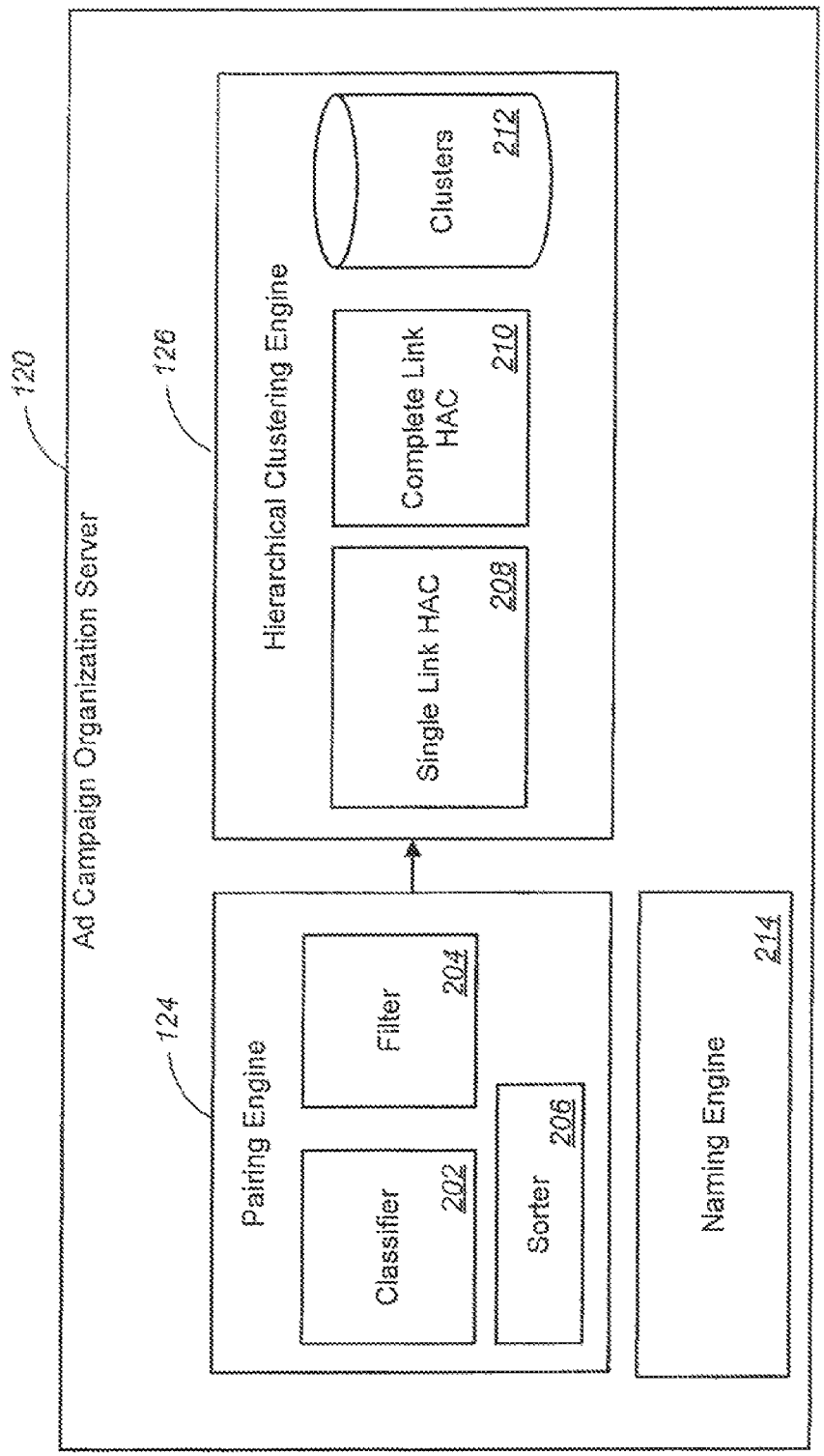
FIG. 2A is a block diagram of an example ad campaign organization server.

Referring to FIG. 2A, the components of the ad campaign organization server 120 can include several elements for pairing keywords and creating clusters. As depicted, the pairing engine 124 includes a classifier 202, a filter 204, and a sorter 206. The hierarchical clustering engine 126 includes a single link hierarchical agglomerative clustering (HAC) engine 208, a complete link HAC engine 210, and a clusters database 212. The server 120 also includes a naming engine 214 to generate meaningful names for the final clusters of keywords.

The ad campaign organization server 120 identifies clusters of keywords that are semantically related. One method is to compute the semantic distance of every pair of keyword, then group the keywords into clusters such that the semantic distance between every two keywords in a cluster is below a threshold value. Determining the semantic distance of every pair of keyword requires a large amount of computation.

In some implementations, in order to reduce the amount of computation, pairs of keywords that are semantically related are first identified, then the keywords are clustered using a hierarchical clustering process based on the semantically related keyword pairs.

FIG. 2B shows an example in which a large set of keywords is processed by the ad campaign organization server 120 and restructured into multiple smaller clusters of keywords. The keywords are processed in various stages described below.

Referring to FIGS. 2A and 2B, in some implementations, the classifier 202 classifies keywords 220 from an ad campaign into categories based on topic clusters predefined in the semantic database 130. All the topic clusters that are associated with any one of the keywords are identified. The ad keywords that are associated with each topic cluster are grouped together as an initial cluster 222. For example, if the all of the topic clusters that are associated with any of the ad keywords include topic clusters 2, 5, 10, etc., then ad keywords that are associated with topic cluster 2 are grouped together as a first initial cluster 222, ad keywords that are associated with topic cluster 5 are grouped together as a second initial cluster 222, and ad keywords that are associated with topic cluster 3 are grouped together as a third initial cluster 222, etc.

For each initial cluster 222, the pairing engine 124 identifies all of the pairs of keywords 224 in the initial cluster 222. For example, if the first initial cluster 222 has n keywords, there are n×(n−1)/2 pairs of keywords 224. After the keyword pairs 224 for each initial group 222 are identified, the keyword pairs 224 for all initial groups 222 form a group of keyword pairs.

By clustering the keywords into initial clusters 222 and identifying the keyword pairs 224 within each initial cluster 222, the number of keyword pairs can be reduced, as compared to identifying keyword pairs of all of the keywords. This reduces the amount of computation that needs to be performed. For example, the number of semantic distances that need to be computed is reduced.

For example, suppose there are 1,000 keywords 220 associated with an ad group. The number of keyword pairs for these 1,000 keywords is 1,000×999/2=499,500. Suppose the 1,000 keywords are divided into 3 initial clusters 222, each having 300, 400, 500 keywords, respectively (note that some keywords may belong to more than one initial cluster 222). The initial cluster having 300 keywords has 300×299/2=44,850 pairs of keywords. The initial cluster having 400 keywords has 400×399/2=79,800 pairs of keywords. The initial cluster having 500 keywords has 500×499/2=124,750 pairs of keywords. The total number of keyword pairs is 249,400, which is much less than the number of keyword pairs for a group of 1,000 keywords.

A keyword can be associated with several topic clusters, so the same keyword pair may appear in different initial clusters 222, resulting in duplicate keyword pairs in the group of keyword pairs. For example, if keywords X1 and X2 are both associated with topic clusters 2 and 5, both the first and second initial clusters 222 have the keyword pair (X1, X2), resulting in at least two entries of keyword pair (X1, X2) in the group of keyword pairs. The filter 204 is used to remove such duplicate keyword pairs.

After the duplicate keyword pairs are removed, the pairing engine 124 determines a semantic distance for each pair of keywords in the group of keyword pairs. The semantic distance of a pair of keywords refers to the semantic distance between the two keywords of the pair. The semantic distance can be determined by, for example, querying the semantic database sever 132. The filter 204 removes keyword pairs that have low correlations (high semantic distances) in which the pairing is not considered to be useful. For example, keyword pairs whose semantic distances are above a threshold value are removed.

The sorter 206 sorts the keyword pairs in the group of keyword pairs according to their semantic distances to generate a sorted list of keyword pairs 226. For example, the keyword pairs can be sorted so that the keyword pairs having smaller semantic distances are placed earlier in the list 226 than those having larger semantic distances.

The output of the pairing engine 124 is a list of keyword pairs 226 sorted according to semantic distance. Duplicate keyword pairs have been removed by the filter 204. Also, because the filter 204 removes keyword pairs having semantic distances above the threshold value, the output list of keyword pairs 226 are all semantically related to a certain degree.

The hierarchical clustering engine 126 receives the list of semantically related keyword pairs 226 from the pairing engine 124. The single link HAC engine 208 performs a rough clustering by grouping keywords that are related according to the pairing relationships. For example, if keywords X1 and X2 belong to a pair, and keywords X2 and X5 belong to a pair, then keywords X1, X2, and X5 are placed in the same cluster, referred to as a single link cluster. The complete link HAC engine 210 further refines the clustering by computing the semantic distances of all keyword pairs in each cluster, and refine the clustering based on the semantic distances.

The single link HAC engine 208 is described below. The single link HAC engine 208 receives the list of keyword pairs 226 that are sorted according to semantic distance and have semantic distances below a threshold. The first keyword pair in the list 226 has the shortest semantic distance. The single link HAC engine 208 can adopt a "bottom-up" approach by starting a new cluster 228 using the first keyword pair and adding related keywords to the cluster 228. The first keyword pair is removed from the list 226 after the keywords of the pair are placed in a cluster 228. For example, suppose the first keyword pair is (X1, X2), then the keywords X1 and X2 are placed in the first cluster 228, and the keyword pair (X1, X2) is removed from the list 226.

The single link HAC engine 208 reviews the list of keyword pairs 226 until it finds a keyword pair having a keyword that is already in the cluster 228, and adds the other keyword of the pair to the cluster 228. The keyword pair whose keywords are in the cluster 228 is removed from the list 226. For example, if the single link HAC engine 208 finds keyword pairs (X2, X5) and (X10, X1), the keywords X5 and X10 are added to the first cluster 228, and the keyword pairs (X2, X5) and (X10, X1) are removed from the list 226. The engine 208 continues reviewing the list of keywords 226 until the last keyword pair in the list 226 is reviewed.

The single link HAC engine 208 repeats the process above and starts a second cluster 228 using the first keyword pair from the list of keywords 226 (note that the keywords in the first cluster 228 have already been removed from the list 226). Additional keywords are added to the second cluster 228 if they have pairing relationships with the keywords already in the second cluster 228. After reviewing the entire list of keyword pairs 226, the single link HAC engine 208 repeats the process above and starts a third cluster 228, etc., until all of the keywords have been placed into one of the clusters 228.

The clusters of keywords 228 formed by the single link HAC engine 208 are referred to as "intermediate clusters" because they are further processed by the complete link HAC engine 210 to form the final clusters 230. The final clusters 230 are the semantic clusters generated by the ad campaign organization server 120. The intermediate clusters 228 have a property such that every keyword is closely related to at least one other keyword in the intermediate cluster 228 so that the pair of keywords have a similarity above a threshold (a semantic distance below a threshold).

Because each intermediate cluster 228 is established based on relationships between pairs of keywords, there may be some keywords in which the semantic distances among the keywords are higher than a threshold. For example, when keywords X1 and X2 are highly related, and keywords X2 and X5 are highly related, the keywords X1 and X5 may not necessarily be highly related. In order to refine the clustering so that all keywords within a cluster are semantically closely related, the complete link HAC engine 210 is used to evaluate "global" relationships among the keywords within a cluster (as opposed to pairing relationships within the cluster) and remove keywords from a cluster if the keywords are not closely related to all of the other keywords in the cluster.

The complete link HAC engine 210 is described below. The complete link HAC engine 210 processes the intermediate clusters 228 formed by the single link HAC engine 208. For each intermediate cluster 228, the engine 210 determines the semantic distances of every pair of keywords in the intermediate cluster 228. The keyword pairs are sorted according to semantic distance. The complete link HAC engine 210 examines each pair of keywords within an intermediate cluster 228, starting from the keyword pair having smallest semantic distance. If the engine 210 finds a keyword pair whose semantic distance is above a threshold, one of the keywords in the pair is removed from the cluster (assuming the other keyword of the pair is semantically closer to the other keywords). The keyword being removed is either used to form a new final cluster 230 or placed in another final cluster 230 such that the semantic distances between that keyword and the keywords of the other final cluster 230 are all below a threshold.

After the complete link HAC engine 210 finishes processing the keywords, the intermediate clusters 228 formed by the single link HAC engine 208 may each be divided into two or more final clusters 230 such that no two keywords within a final cluster 230 have semantic distances above a threshold. In other words, every keyword in the final cluster 230 formed by the complete link HAC engine 210 is closely related (to a certain degree) to all the other keywords within the final cluster 230.

The clusters database 212 stores intermediate clusters 228 generated by the single link HAC engine 208 and the final clusters 230 generated by the complete link HAC engine 210. For example, the single link HAC engine 208 may store its output intermediate clusters 228 in the clusters database 212. The complete link HAC engine 210 may retrieve the intermediate clusters 228 from the clusters database 212, and, after processing, store the final clusters 230 in the clusters database 212. The clusters database 212 may represent clusters of keywords using, for example, tables, linked lists, and ordered pairs, etc.

The naming engine 214 generates a name 232 for each of the final clusters 230. The names can be meaningful words or phrases that are representative of the clusters. This allows users to easily refer to the clusters 230 by their names 232.

Figure 3:
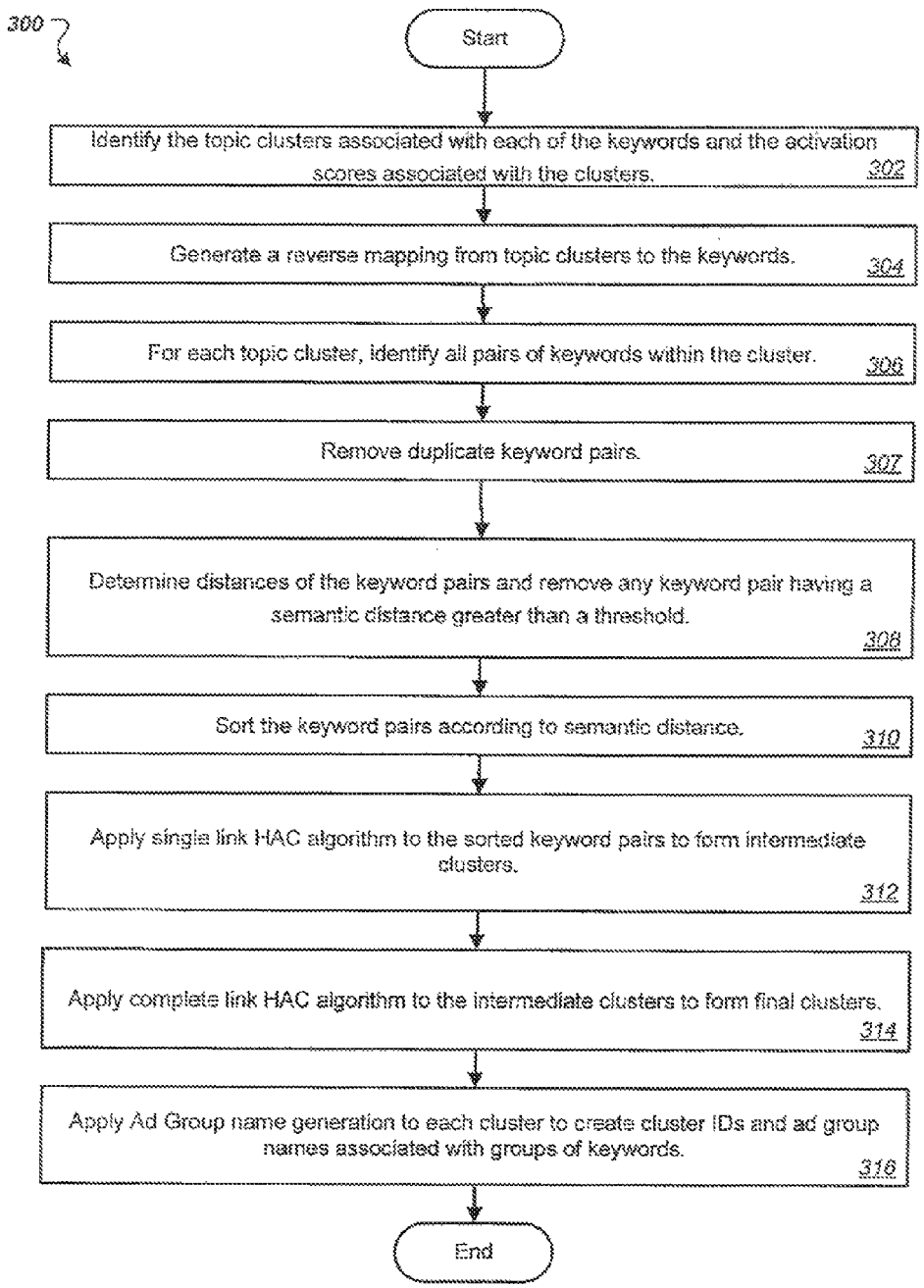
FIG. 3 is a flow diagram of an example process for clustering keywords of an ad group.

Referring to FIG. 3, an example process 300 can be used to identify semantic clusters of keywords that are associated with ad campaigns 106. Each of the semantic clusters produced by the process 300 can have a smaller number of keywords that are more closely related than the original set of keywords. For example, the process 300 can be implemented using the ad campaign organization server 120.

Figure 5:
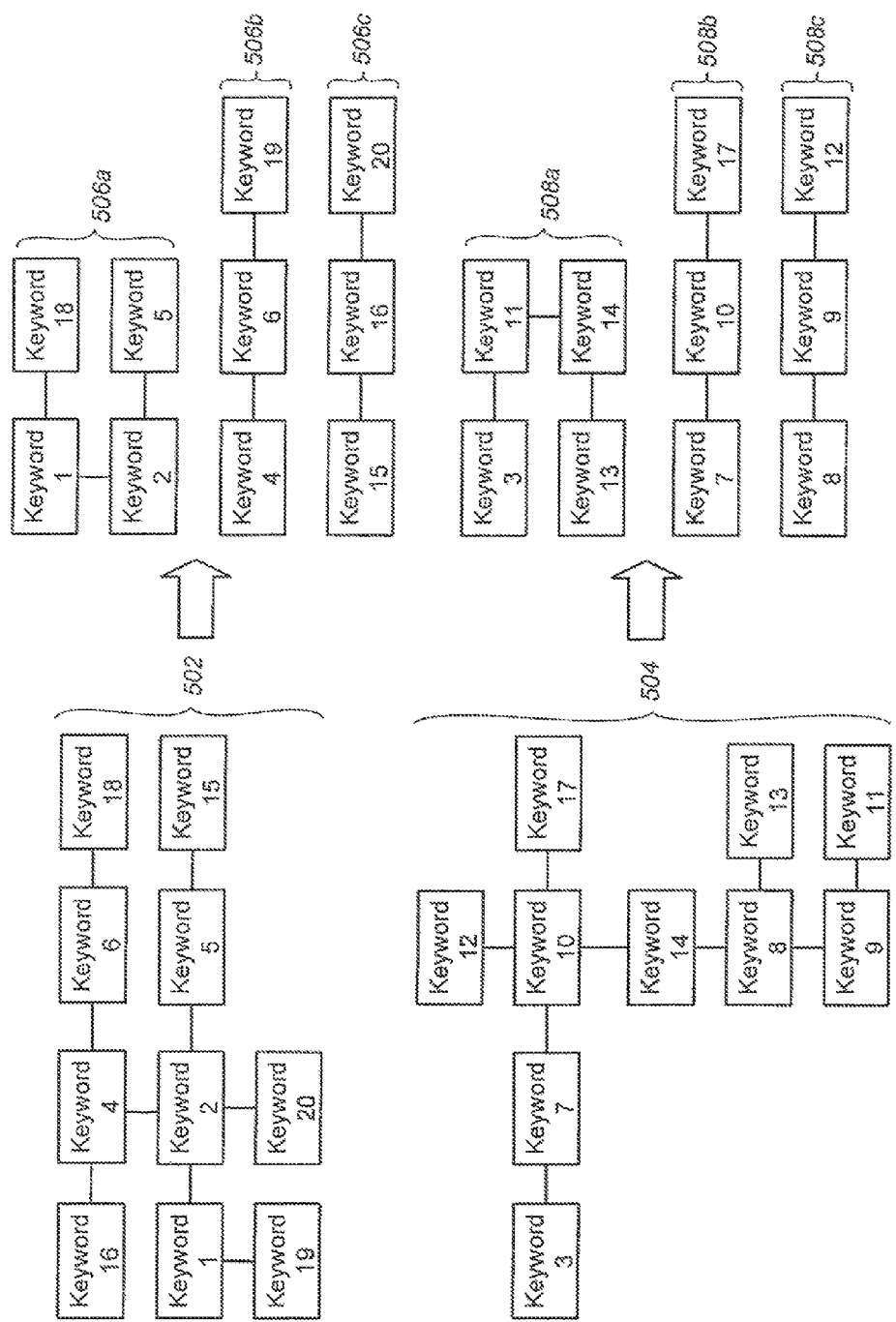
FIG. 5 is a block diagram showing examples of intermediary clusters and final clusters.

To illustrate how keywords are clustered according to the process 300, an example is provided in FIGS. 4 and 5 in which 20 keywords are grouped into 6 final clusters. In this example, the keywords are associated with ten topic clusters in the semantic database 130.

Referring to FIG. 4, a topic cluster table 402 shows relationships between keywords 404 and topic clusters 406. In this example, the topic cluster table 402 is organized as a matrix associating twenty keywords 404 with ten topic clusters 406. An individual cell in the topic cluster table 402 marked with an "x" mark indicates that a keyword 404 in the same row as the "x" mark is associated with a topic clusters 406 in the same column as the "x" mark.

For example, row 408 for keyword 1 includes "x" marks in the columns corresponding to topic clusters 1, 5 and 10, indicating that keyword 1 is associated with the topic clusters 1, 5 and 10. Similarly, row 410 for keyword 2 includes "x" marks in the columns corresponding to topic clusters 1, 3, 6 and 10, indicating that keyword 2 is associated with the topic clusters 1, 3, 6 and 10. Columns in the topic cluster table 402 show the keywords that are associated with a particular topic cluster 406. For example, column 414 shows that keywords 1, 2, 5 and 15 are associated with topic cluster 1. Similarly, column 416 shows that keywords 3, 7, 10 and 17 are associated with topic cluster 2.

Referring to FIGS. 3 and 4, for a given set of keywords associated with an ad campaign, the process 300 identifies the topic clusters associated with each of the keywords and the activation scores associated with the topic clusters (302). For example, the topic clusters associated with each of the keywords can be identified using the classifier 202.

In the example shown in FIG. 4, each row in table 402 shows the topic clusters 406 associated with a keyword in the left-most column of table 402. In this example, keyword 1 is associated with topic clusters 1, 5, and 10. Each of topic clusters 1, 5, and 10 has an associated activation score (not shown in the figure) with respect to keyword 1. Keyword 2 is associated with topic clusters 1, 3, 6, and 10. Each of topic clusters 1, 3, 6, and 10 has an associated activation score with respect to keyword 2, and so forth. Keyword 3 is associated with topic cluster 2. Keyword 4 is associated with topic clusters 4 and 10. Keyword 5 is associated with topic clusters 1 and 4. Keyword 6 is associated with topic cluster 4. Keyword 7 is associated with topic clusters 2 and 8. Keyword 8 is associated with topic clusters 7, 9, and 10. Keyword 9 is associated with topic cluster 7. Keyword 10 is associated with topic clusters 2 and 8. Keyword 11 is associated with topic cluster 10. Keyword 12 is associated with topic cluster 8. Keyword 13 is associated with topic cluster 9. Keyword 14 is associated with topic cluster 7. Keyword 15 is associated with topic cluster 1. Keyword 16 is associated with topic cluster 6. Keyword 17 is associated with topic cluster 2. Keyword 18 is associated with topic cluster 4. Keyword 19 is associated with topic cluster 5. Keyword 20 is associated with topic cluster 3.

The process 300 generates a reverse mapping of the topic clusters 406 to the keywords 404 associated with each topic cluster (304). For example, the reverse mapping can be performed using the classifier 202. Each column in table 402 shows the keywords associated with a topic cluster 406 in the upper-most row of table 402. In this example, topic cluster 1 is associated with keywords 1, 2, 5, and 15. Topic cluster 2 is associated with keywords 3, 7, 10, and 17. Topic cluster 3 is associated with keywords 2 and 20. Topic cluster 4 is associated with keywords 4, 5, 6, and 18. Topic cluster 5 is associated with keywords 1 and 19. Topic cluster 6 is associated with keywords 2 and 16. Topic cluster 7 is associated with keywords 8, 9, and 14. Topic cluster 8 is associated with keywords 7, 10, and 12. Topic cluster 9 is associated with keywords 8 and 13. Topic cluster 10 is associated with keywords 1, 2, 4, 8, and 11.

For each topic cluster, the process 300 identifies all pairs of keywords within the topic cluster (306). For example, for topic cluster 1, keyword pairs (1, 2), (1, 5), (1, 15), (2, 5), (2, 15), and (5, 15) are identified. In this document, the keyword pair (keyword i, keyword j) will simply be referred to as (i, j). For topic cluster 2, keyword pairs (3, 7), (3, 10), (3, 17), (7, 10), (7, 17) and (10, 17) are identified. For topic cluster 3, keyword pair (2, 20) is identified. For topic cluster 4, keyword pairs (4, 5), (4, 6), (4, 18), (5, 6), (5, 18) and (6, 18) are identified. For topic cluster 5, keyword pair (1, 19) is identified. For topic cluster 6, keyword pair (2, 16) is identified. For topic cluster 7, keyword pairs (8, 9), (8, 14) and (9, 14) are identified. For topic cluster 8, keyword pairs (7, 10), (7, 12) and (10, 12) are identified. For topic cluster 9, keyword pair (8, 13) is identified. For topic cluster 10, keyword pairs (1, 2), (1, 4), (1, 8), (1, 11), (2, 4), (2, 8), (2, 11), (4, 8), (4, 11) and (8, 11) are identified.

The process 300 removes the duplicate keyword pairs (307). For example, the duplicate keyword pairs can be removed using the filter 204. Because a keyword can be associated with multiple topic clusters, the same pair of keywords can be associated with multiple topic clusters. This results in duplicate keyword pairs. For example, the keyword pair (1, 2) is associated with both topic clusters 1 and 10, so the keyword pair (1, 2) appears twice. The forward mapping from keywords to topic clusters can assist in removing such duplicates. For example, keyword pair (1, 2) appears in topic cluster 1. Because keyword 1 is associated with topic clusters 5 and 10, the topic clusters associated with keyword 2 are also examined to see if they include topic clusters 5 and 10. In this example, topic cluster 10 is also associated with keyword 2, so the filter 204 knows that there is a duplicate keyword pair (1, 2) associated with topic cluster 10. The duplicate keyword pair (1, 2) is removed from the group of keyword pairs associated with topic cluster 10.

The process 300 determines the semantic distances of the keyword pairs, and removes keyword pairs having semantic distances larger than a threshold (thereby removing keyword pairs that are dissimilar) (308). For example, the keyword pairs having semantic distances larger than a threshold can be removed by the filter 204. Removing duplicate keyword pairs in step 307 and removing keyword pairs having semantic distances below a threshold can reduce the number of computations required in subsequent steps.

In some examples, the semantic distance between two keywords can be determined by calculating an inverse of a dot product between the cluster vectors associated with the two keywords. For example, suppose a first keyword is associated with topic clusters A, B, and C with activation scores 0.25, 0.45, and 0.66 respectively, and a second keyword is associated with topic clusters A, B, and D with activation scores 0.3, 0.09, and 0.2 respectively. A cluster vector g1 associated with the first keyword is g1=<A: 0.25, B: 0.45, C: 0.66>, and a cluster vector g2 associated with the second keyword is g2=<A: 0.3, B: 0.16, D: 0.2>. A similarity score between the first and second keywords can be calculated as:

similarity score=g1·g2=c·(0.25·0.3+0.45·0.16)
=c·0.147, where c is a normalization value.

The semantic distance can be the inverse of the similarity score:

semantic distance=(similarity score)$^{-1}$=(g1·g2).

In general, a similarity score of two keywords can be represented as a dot product of the cluster vectors:

$$v \cdot w = \sum_{i=1}^{n} v_i w_i = v_1 w_1 + v_2 w_2 + \ldots + v_n w_n,$$

where v is a cluster vector associated with the first keyword, w is a cluster vector associated with the second keyword, $v_i$ represents the score of topic cluster i associated with the keyword v, and $w_i$ represents the score of topic cluster i associated with the keyword w. If two keywords are associated with the same topic cluster i, $v_i w_i$ will have a non-zero contribution to the dot product. A higher v·w means that the keywords v and w are both associated with similar topic clusters, so the two keywords are more similar to each other.

In some implementations, the activation scores can be made more linear by using a "squashing" process before computing the dot product so that the similarity score or the semantic distance value is not dominated by an activation score that is significantly larger than the other scores.

For example, an activation score "a" can be squashed using the formula:

$a=1.2*a/(0.2+a)$. (Equ. 1)

The similarity score can be computed using the dot product of the cluster vectors' squashed activation scores:

$$\text{similarity score} = \sum_{i=1}^{n} a_i \Box b_i,$$ (Equ. 2)

where a is a cluster vector associated with the first keyword, b is a cluster vector associated with the second keyword. The similarity score can be further squashed to make the distance metric more linear by using the formula:

similarity score=similarity score/(0.2+similarity score). (Equ. 3)

In the example of FIG. 4, suppose the activation scores for topic clusters 1, 5, and 10 associated with keyword 1 are 0.4, 1.2, and 0.3, respectively. The squashed activation scores for topic clusters 1, 5, and 10 are 0.8, 1.029, and 0.78, respectively. Suppose the activation scores for topic clusters 1, 3, 6, and 10 associated with keyword 2 are 0.2, 0.4, 0.25, and 1000, respectively. The squashed activation scores for topic clusters 1, 3, 6, and 10 are 0.6, 0.8, 0.667, and 1.2, respectively.

Without squashing, the contributions of the activation scores of topic clusters 1 and 10 are 0.4*0.2=0.08 and 0.3*1000=300, respectively. The contribution of the topic cluster 1 is insignificant compared to the contribution of the topic cluster 10. By comparison, the squashed activation scores associated with topic clusters 1 and 10 are 0.8*0.6=0.48 and 0.78*1.2=0.936, respectively. Topic cluster 10 has a larger influence than topic cluster 1, but the influence of topic cluster 10 is not so large as to eclipse the contribution of topic cluster 1.

Various modifications can be made to the squashing process. For example, certain constant values in equation 1 can be modified as follows:

$$a=0.2*a/(0.2+a). \qquad \text{(Equ. 4)}$$

The semantic distance can be calculated as follows:

$$\text{semantic distance}=1.1-\text{similarity score}. \qquad \text{(Equ. 5)}$$

In this example, equations 2, 4, and 5 can be used to calculate the semantic distances among keywords.

In some implementations, when the topic clusters do not match, a vector's squashed activation score can be subtracted from the similarity score. Thus, when two keywords are associated with the same topic cluster, the dot product of the activation scores (or squashed activation scores) for that topic cluster will make a positive contribution to the similarity score. On the other hand, when a keyword is associated with a topic cluster that is not associated with the other keyword, the activation score (or squashed activation score) for that topic cluster will make a negative contribution to the similarity score.

In the example above, for keyword 1, the squashed activation scores for topic clusters 1, 5, and 10 are 0.8, 1.029, and 0.78, respectively. For keyword 2, the squashed activation scores for topic clusters 1, 3, 6, and 10 are 0.6, 0.8, 0.667, and 1.2, respectively. Because topic cluster 5 is associated with keyword 1 but not with keyword 2, and topic clusters 3 and 6 are associated with keyword 2 but not with keyword 1, the squashed activation scores for the topic clusters 5, 3, and 6 can be subtracted from the similarity score.

In the example shown in FIGS. 4 and 5, it is assumed that the keyword pairs (1, 11), (4, 8), (1, 8), (2, 8), (2, 11), (4, 11) have semantic distances above threshold. The process 300 removes these keyword pairs. Eliminating keyword pairs that are dissimilar can reduce the computations required for subsequent steps.

The process 300 sorts the keyword pairs according to semantic distance (310). For example, the keyword pairs can be sorted so that the keyword pair having the shortest distance is placed first in the sequence. The keyword pairs can be sorted by the sorter 206. In this example, it is assumed that the keyword pairs are sorted in a sequence:

{(1, 2), (2, 5), (3, 7), (7, 10), (2, 16), (4, 5), (10, 12), (10, 14), (10, 17), (4, 6), (8, 13), (8, 9), (1, 19), (2, 20), (5, 18), (6, 18), (9, 11)}.

with keyword pair (1, 2) having the smallest semantic distance.

The process 300 applies a single link HAC algorithm to the sorted keyword pairs to form intermediate clusters (312). The single link HAC algorithm generates intermediate clusters based on pairing relationships between keywords. Intermediate clusters are formed by starting with the keywords in the keyword pair having the smallest distance. A keyword Xi is added to the intermediate cluster if the keyword Xi and at least one other keyword Xj already in the intermediate cluster have previously been identified as a keyword pair (Xi, Xj). A distance threshold (e.g., semantic distance) can be used so that for a new keyword to be added to the intermediate cluster, the semantic distance of the new keyword and its paired keyword has to be below a threshold.

In this example, the process 300 starts with an intermediate cluster 502 (see FIG. 5) that includes keywords 1 and 2 because the keyword pair (1, 2) has the smallest semantic distance. The keyword pair (2, 5) is identified in the sorted sequence of keyword pairs. Keyword 5 is paired with keyword 2, which is already in the intermediate cluster, so keyword 5 is added to the intermediate cluster 502, which becomes {1, 2, 5}. Next, the keyword pair (2, 16) is identified in the sorted sequence of keyword pairs. Because keyword 16 has a pairing relationship with keyword 2, keyword 16 is added to the intermediate cluster 502, which becomes {1, 2, 5, 16}, and so forth.

After all the keywords have been examined, and no additional keywords can be added to the first intermediate cluster 502, the process 300 generates a new intermediate cluster 504 by using a pair of keywords having the smallest semantic distance that have not already been placed in previous intermediate clusters (e.g., 502), and repeats the process described above.

Referring to FIG. 5, by clustering keywords that have pairing relationships, the process 300 generates a first intermediate cluster 502 and a second intermediate cluster 504:

First intermediate cluster 502: {1, 2, 4, 5, 6, 15, 16, 18, 19, 20}.

Second intermediate cluster 504: {3, 7, 8, 9, 10, 11, 12, 13, 14, 17}.

For example, the single link HAC engine 208 can be used to apply the single link HAC algorithm to the sorted sequence of keyword pairs. The output of the single link HAC engine 208 can include intermediate cluster IDs and a set of keywords associated with each intermediate cluster. The intermediate clusters can each include keywords that are more semantically related than the original set of keywords associated with the ad campaign.

The process 300 applies a complete link HAC algorithm to the intermediate clusters (314). For each intermediate cluster, the semantic distances for all pairs within the intermediate cluster are calculated. For a keyword to remain in the cluster, the distance between the keyword and every other keyword in the cluster has to be less than a specified threshold.

In this example, it is assumed that applying the complete link HAC algorithm to the intermediate cluster 502 can produce final clusters 506a to 506c:

Final cluster 1 506a: {1, 2, 5, 18},
Final cluster 2 506b: {4, 6, 19}, and
Final cluster 3 506c: {15, 16, 20}.

It is assumed that applying the complete link HAC algorithm to the intermediate cluster 504 can produce final clusters 508a to 508c:

Final cluster 4 508a: {3, 11, 13, 14},
Final cluster 5 508b: {7, 10, 17}, and
Final cluster 6 508c: {8, 9, 12}.

For example, the complete link HAC engine 210 can be used to apply the complete link HAC algorithm to the keywords in the intermediate clusters to generate the final clusters. Each final cluster includes keywords that can be more semantically related than the keywords in the intermediate clusters.

In some implementations, the complete link HAC algorithm can be applied in parallel to various intermediate clusters (e.g., intermediate clusters 502 and 504). When there is a large number of keywords, parallel processing can significantly reduce the amount of computation time for clustering the keywords.

The process 300 generates an ad group name for each cluster that is output by the complete link HAC algorithm (316). This allows users to refer to the final clusters of keywords with semantically meaningful names. For example, rather than saying "keywords in ad group 001" or "keywords in ad group 002", a user can say "keywords in ad group 'home insurance' and keywords in ad group "auto insurance"", etc.

For example, the ad group name for a particular cluster can be based on one or more of the keywords that are included in the particular cluster. Sometimes, two or more ad group can have similar names that include different numbers appended to identical keywords (e.g., "home insurance 1" and "home insurance 2").

In some implementations, naming ad groups can involve the use of a classifier that, for a given keyword, returns a vector of classes and associated confidence scores. The classes can be hierarchical so that a more general class (e.g., "electronics") can include more specific sub-classes (e.g., "digital cameras"). Classes can be constructed using a combination of automated and manual processes. For example, an operator who is familiar with a large ad group may make manual changes to classes, such as to change the hierarchies of classes, or to add and remove classes. For example, a keyword "pixel resolution" can be associated with classes "consumer products", "electronics", "cameras", "digital cameras", "point-and-shoot digital cameras", etc. To determine an adgroup name that can represent the keywords in a final cluster, the classes associated with the keywords are taken into account when determining a general classification, and keywords associated with the general classification can be used as the adgroup name.

In some implementations, the ad campaign organization server 120 allows users to manually adjust the final clusters determined by the server and the names assigned to each adgroup.

The following describes an example process for classifying a set of keywords of a large adgroup into of smaller clusters each having keywords that are more semantically related than the original set of keywords.

Figure 6:
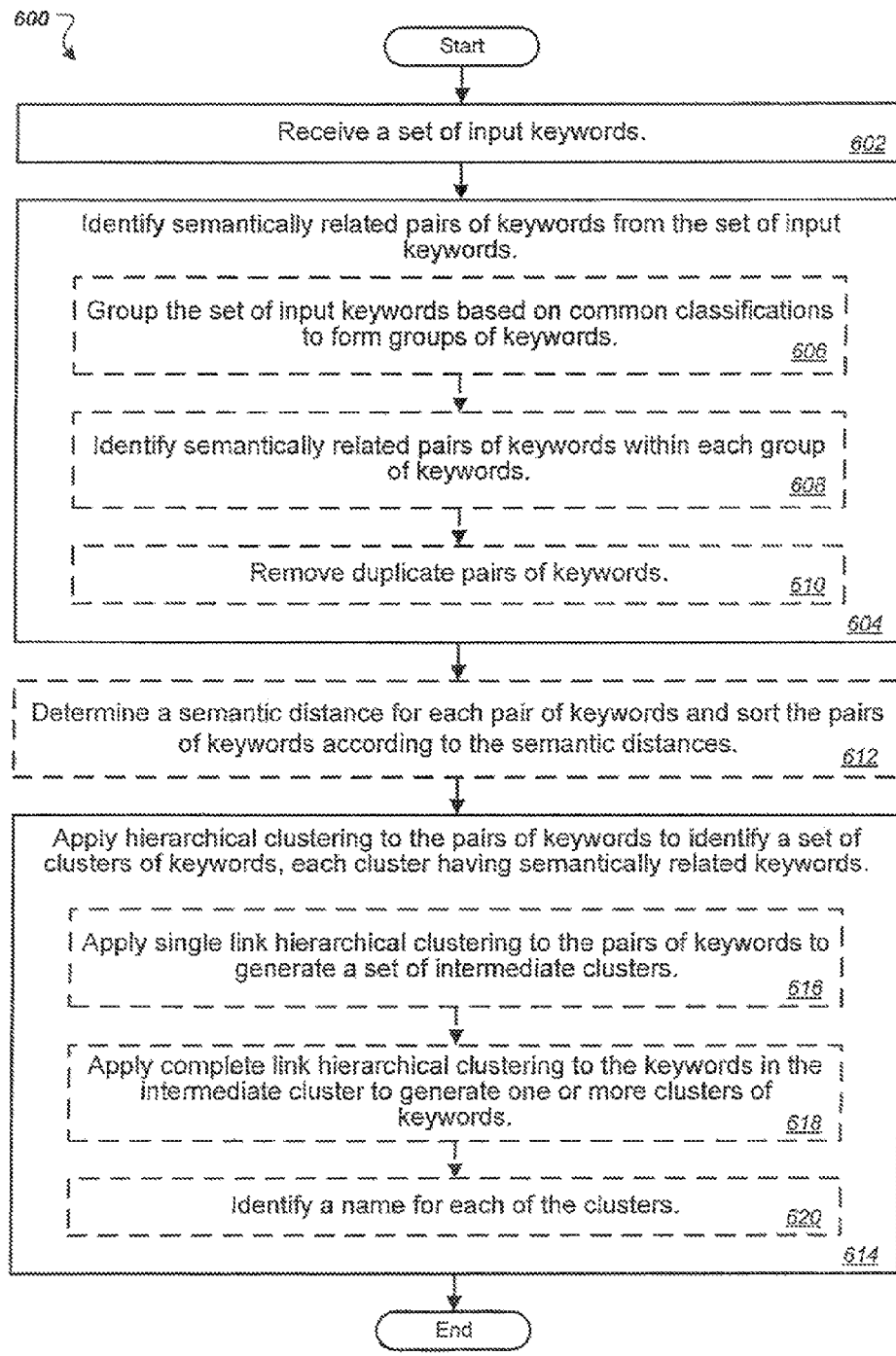
FIGS. 6 and 7 are flow diagrams of example processes for identifying clusters of keywords.

Referring to FIG. 6, an example cluster identification process 600 can identify clusters of keywords that are semantically related. Initially, a set of input keywords is received (602). The keywords can be, for example, a large number (e.g., several million) of keywords in a large ad campaign.

The process 600 identifies semantically related pairs of keywords from the set of input keywords (604). For example, the pairing of keywords can be performed by the pairing engine 124. The pairing of keywords can rely on semantic relationships that are defined using, for example, the semantic database 130.

In some implementations, identifying semantically related pairs of keywords can include grouping the input keywords based on common classifications, resulting in several groups of keywords in which each group includes keywords associated with a particular common classification (606). For example, the common classifications can be the topic clusters predefined in the semantic database 130. The grouping can be performed by the classifier 202, which can access the semantic database 130 to obtain the common classifications used for categorizing keywords.

Semantically related pairs of keywords can be identified within each group of keywords (608). For example, all the pairs of keywords within each group identified in step 606 are identified. Duplicate pairs of keywords can be removed (610). For example, the filter 204 can remove duplicate keyword pairs.

The process 600 determines a semantic distance for each pair of keywords, and the pairs of keywords are sorted according to the semantic distances (612). For example, semantic distance of two keywords can be determined using a dot product of cluster vectors associated with the keywords. The cluster vectors can be obtained by querying the semantic database 130. The sorter 206 can be used to sort the keyword pairs.

The process 600 applies hierarchical clustering to the pairs of keywords to identify a set of clusters of keywords, each cluster having semantically related keywords (614). For example, the clustering can be performed by the hierarchical clustering engine 126 to cluster keyword pairs produced by the pairing engine 124.

In some implementations, the application of hierarchical clustering includes applying a single link hierarchical clustering to the pairs of keywords to generate a set of intermediate clusters (616). For example, the single link HAC engine 208 can generate intermediate clusters, such as intermediate clusters 502 and 504.

A complete link hierarchical clustering can be applied to the keywords in each of the intermediate clusters to generate one or more clusters of keywords for each intermediate cluster (618). For example, the complete link HAC engine 210 can generate final clusters 506a to 506c from the first intermediate cluster 502, and generate final clusters 508a to 508c from the second intermediate cluster 504.

The process 600 identifies a name for each of the final clusters (620). For example, the naming engine 214 can be used to identify a semantically meaningful name for each final cluster produced by the complete link HAC engine 210.

The following describes an example process for identifying clusters of keywords from an input set of keywords.

Figure 7:
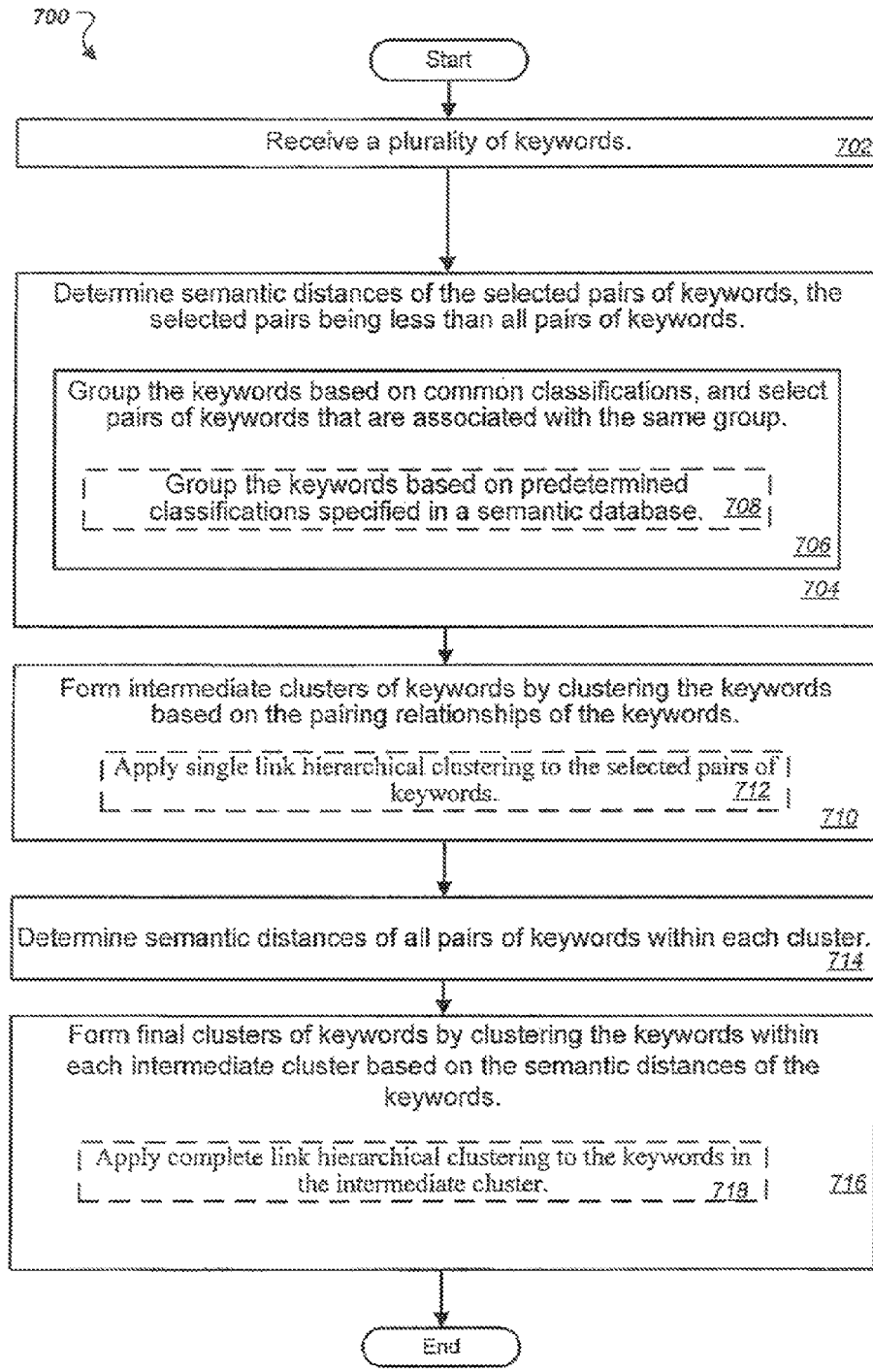

Referring to FIG. 7, an example cluster identification process 700 can form clusters of keywords from an input set of keywords so that each cluster includes keywords that have higher semantic similarity than the original set of keywords. Initially, a plurality of keywords is received (702).

The process 700 determines semantic distances of selected pairs of keywords, the selected pairs being less than all pairs of keywords. Keywords are grouped based on common classifications, and pairs of keywords that are associated with the same group are selected (704). For example, the keywords can be grouped based on predetermined classifications specified in a semantic database (708). Two keywords that do not belong to the same classification are not identified as a pair, so the selected keyword pairs identified in step 704 can be less than all pairs of keywords.

The process 700 forms intermediate clusters of keywords by clustering the keywords based on the pairing relationships of the keywords (710). For example, the single link HAC engine 208 can apply a single link HAC algorithm to the selected pairs of keywords to form intermediate clusters of keywords (712). For example, the intermediate clusters can be the intermediate clusters 502 and 504 of FIG. 5.

The process 700 determines the semantic distances of all pairs of keywords within each intermediate cluster (714).

The process 700 forms final clusters of keywords by clustering the keywords within each intermediate cluster based on the semantic distances of the keywords (716). For example, the complete link HAC engine 210 can apply a complete link HAC algorithm to each intermediate cluster of keywords to form final clusters (718). For example, the final clusters can be the final clusters 506a to 506c and 508a to 508c of FIG. 5.

FIG. 8 shows an example of a list of ad keywords 730 that are associated with an ad campaign.

FIG. 9 shows an example of final clusters 740 of the keywords generated by using the ad campaign organization server 120. For example, one of the processes 300, 600, and 700 can be used in forming the clusters.

Figure 10:
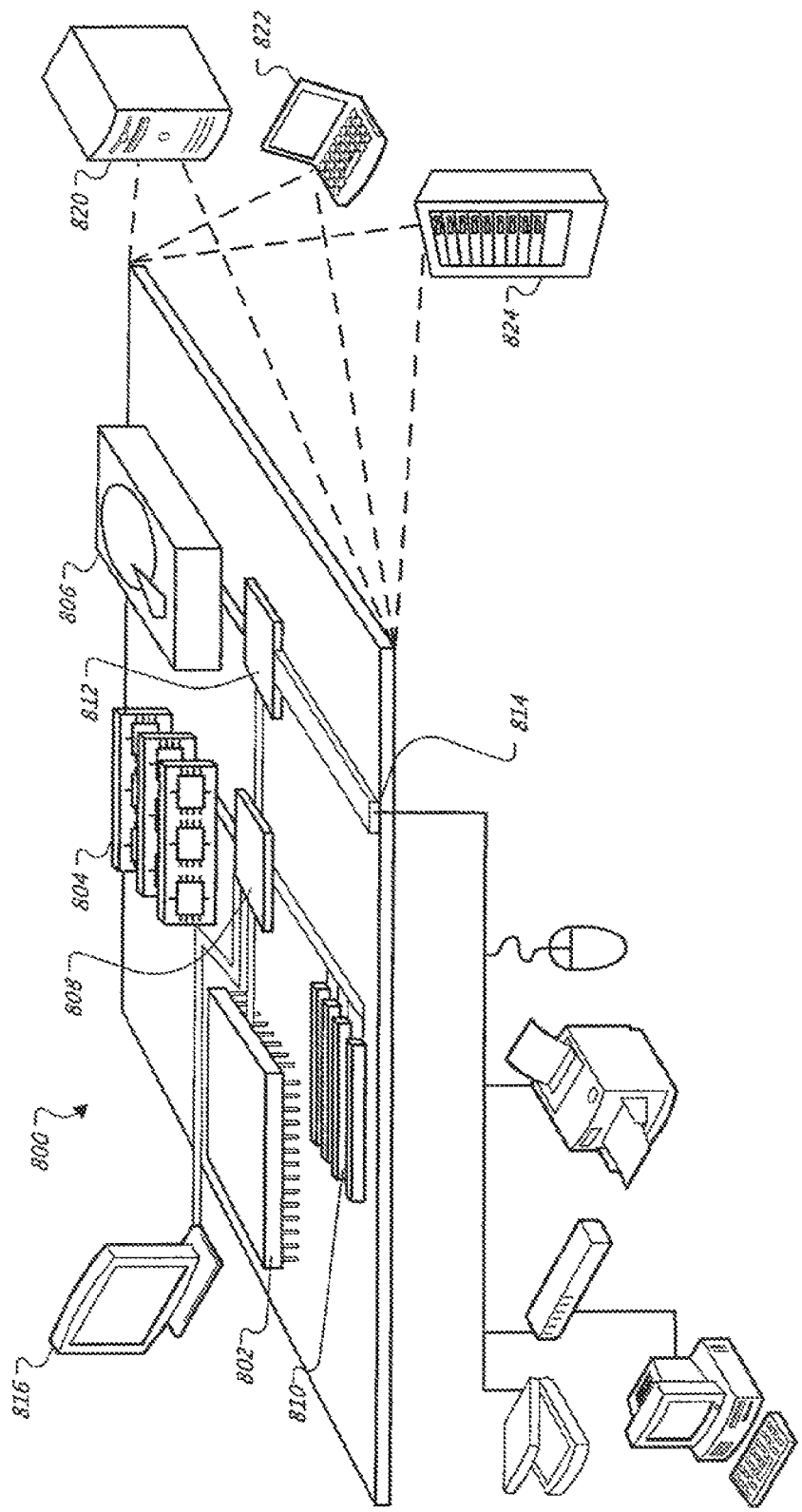
FIG. 10 is a schematic representation of a general computing system.

FIG. 10 is a schematic representation of a general computing system 800 that can be used to implement the system 100 or components of the system 100. Computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Each of such devices (e.g., standard server, rack server system, personal computer, laptop computer) may contain one or more of computing device 800, and an entire system may be made up of multiple computing devices 800 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations and examples have been described. Nevertheless, it will be understood that various modifications may be made without departing from the spirit and scope of the invention. For example, various forms of the flows shown above may be used, with steps re-ordered, added, or removed. Also, although several applications and methods have been described, it should be recognized that numerous other applications are contemplated.

For example, various methods can be used to categorize keywords into the topic clusters in the semantic database 130. In determining pairs of semantically related keywords, the pairing engine 124 can use methods other than those described above. For example, keywords that correspond to products or services that share common qualities, concepts or other attributes can be categorized in the same topic cluster. Different types of categorization groupings can be used, such as type, attribute/schema, broad concept, genre/style, etc.

For example, a "type" grouping (or "is-a" grouping) can group items using item type (or "is-a") relationships (often referred to as a taxonomy) to generate some of the topic clusters. Items within such a type category can be generally accepted to be the same type of "thing" (e.g., a digital camera).

"Function/need" grouping can group items by function or need to generate some of the topic clusters. For example, items in a "cameras" group may allow a person to take photographs, and items in a "dental care" group may provide for tooth and dental hygiene needs. Function/need grouping can provide useful grouping, for instance, for online shopping and browsing.

"Attribute/schema" grouping items by attributes can further categorize items within in a particular category by using quantitative attributes to generate some of the topic clusters. For example, attribute/schema grouping in a "cars" category can sub-categorize the cars by make, model, year and environmental scores (e.g., hybrids, fuel efficiency, etc.). By comparison, attribute/schema grouping in a "digital cameras" category can sub-categorize the cameras by price, megapixels or other quantitative features. Attributes can also be used to group things in other ways, such as a "fan merchandise" category with attributes such as league, team, and city.

"Broad concept" grouping can group items by concept to generate some of the topic clusters. For example, all items within a particular category can be conceptually related, even though they may not share any attributes, satisfy the same needs, or be used at the same time. For example, a "home and garden" category can contain a broad spectrum of products for use in the home, and a "football" category can contain all kinds of football-related paraphernalia. Other broad concepts can include: "collectible", "non-collectible", "new", "used", "B2B", "consumer", "accessory", "product", "bargains", "gifts", etc.

"Genre/style" grouping can group items by genre or style to generate some of the topic clusters. Such grouping can be used, for example, in media categories where few other high-level qualities are available to distinguish between items. Items within a category can be recognized objectively as being similar in style. For example, genres in a "books" category can include mystery, horror, science fiction, young adult, food, environmental, etc. Genres can also apply to other categories, such as in a "furniture" category (e.g., modern, traditional, etc.).

Various types of user interfaces can be used to allow the advertiser 104 and the user 102 to interact with the system 100.

In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
   receiving selection criteria for a campaign, the selection criteria including a plurality of keywords that control distribution of content items associated with the campaign;
   assigning, by a computer, each of the selection criteria to one or more sets of topic clusters, wherein at least some of the selection criteria are assigned to multiple topic clusters;
   determining, by a computer and for pairs of selection criteria in one of the topic clusters, a measure of similarity between the topic clusters to which each selection criteria in the pair was assigned;
   identifying, by a computer and as related pairs of selection criteria, the pairs of selection criteria for which the measure of similarity meets a threshold;
   creating a new keyword cluster based on the related pairs, the new keyword cluster including fewer than all of the keywords in the received selection criteria, the creating comprising:
      identifying a first selection keyword and a second selection keyword that are included in one of the related pairs; and
      including each of the first selection keyword and the second selection keyword in the new keyword cluster; and
   creating, by a computer, a new group for the campaign, the new group specifying at least one content item that is selected for distribution using keywords in the new keyword cluster.

2. The method of claim 1, wherein assigning each of the selection criteria to one or more sets of topic clusters comprises assigning each selection keyword in a set of selection keywords to one or more topic clusters corresponding to predetermined classifications.

3. The method of claim 1, wherein identifying the related pairs of selection criteria comprises:
   for each of the pairs of selection criteria:
      determining for each of the pairs of selection criteria a measure of vector similarity between a first topic vector for a first selection criteria in the pair and a second topic vector for a second selection criteria is the pair, the topic vector for each selection criteria specifying the topic clusters to which the selection criteria was assigned; and
      selecting, as the related pairs of selection criteria, the pairs of selection criteria for which the measure of vector similarity meets a threshold vector similarity.

4. The method of claim 1, further comprising selecting a name for the group based on one or more topic clusters to which the related pairs in the new keyword cluster were assigned.

5. The method of claim 1, wherein creating a new keyword cluster based on the related pairs comprises creating a new keyword cluster that is exclusive of pairs of selection criteria having measures of similarity that failed to meet the threshold.

6. The method of claim 1, wherein creating a new keyword cluster based on the related pairs comprises selecting, for inclusion in the new keyword cluster, at the pair of selection criteria having a highest measure of similarity.

7. A system comprising:
   a database storing a plurality of selection criteria for a campaign, the selection criteria including a plurality of keywords that control distribution of content items associated with the campaign; and
   one or more computers including one or more processors that interact with the database and upon execution of a set of instructions perform operations comprising:
      identifying, from the database, the selection criteria for the campaign;
      assigning each of the selection criteria to one or more sets of topic clusters, wherein at least some of the selection criteria are assigned to multiple topic clusters;
      determining, for pairs of selection criteria in one of the topic clusters, a measure of similarity between the topic clusters to which each selection criteria in the pair was assigned;
      identifying, as related pairs of selection criteria, the pairs of selection criteria for which the measure of similarity meets a threshold;
      creating a new keyword cluster based on the related pairs, the new keyword cluster including fewer than all of the keywords in the identified selection criteria, the creating comprising:
         identifying a first selection keyword and a second selection keyword that are included in one of the related pairs; and
         including each of the first selection keyword and the second selection keyword in the new keyword cluster; and
      creating a new group for the campaign, the new group specifying at least one content item that is selected for distribution using keywords in the new keyword cluster.

8. The system of claim 7, wherein assigning each of the selection criteria to one or more sets of topic clusters comprises assigning each selection keyword in a set of selection keywords to one or more topic clusters corresponding to predetermined classifications.

9. The system of claim 7, wherein identifying the related pairs of selection criteria comprises:
   for each of the pairs of selection criteria:
      determining for each of the pairs of selection criteria a measure of vector similarity between a first topic vector for a first selection criteria in the pair and a second topic vector for a second selection criteria is the pair, the topic vector for each selection criteria specifying the topic clusters to which the selection criteria was assigned; and
      selecting, as the related pairs of selection criteria, the pairs of selection criteria for which the measure of vector similarity meets a threshold vector similarity.

10. The system of claim 7, wherein the one or more processors perform operations comprising selecting a name for the group based on one or more topic clusters to which the related pairs in the new keyword cluster were assigned.

11. The system of claim 7, wherein creating a new keyword cluster based on the related pairs comprises creating a new keyword cluster that is exclusive of pairs of selection criteria having measures of similarity that failed to meet the threshold.

12. The system of claim 7, wherein creating a new keyword cluster based on the related pairs comprises selecting, for inclusion in the new keyword cluster, at the pair of selection criteria having a highest measure of similarity.

13. A computer storage device storing instructions that upon execution by a data processing apparatus cause the data processing apparatus to perform operations comprising:
   receiving selection criteria for a campaign, the selection criteria including a plurality of keywords that control distribution of content items associated with the campaign;
   assigning each of the selection criteria to one or more sets of topic clusters, wherein at least some of the selection criteria are assigned to multiple topic clusters;
   determining, for pairs of selection criteria in one of the topic clusters, a measure of similarity between the topic clusters to which each selection criteria in the pair was assigned;
   identifying, as related pairs of selection criteria, the pairs of selection criteria for which the measure of similarity meets a threshold;
   creating a new keyword cluster based on the related pairs, the new keyword cluster including fewer than all of the keywords in the received selection criteria, the creating comprising:
      identifying a first selection keyword and a second selection keyword that are included in one of the related pairs; and
      including each of the first selection keyword and the second selection keyword in the new keyword cluster; and
   creating a new group for the campaign, the new group specifying at least one content item that is selected for distribution using keywords in the new keyword cluster.

14. The computer storage device of claim 13, wherein assigning each of the selection criteria to one or more sets of topic clusters comprises assigning each selection keyword in a set of selection keywords to one or more topic clusters corresponding to predetermined classifications.

15. The computer storage device of claim 13, wherein identifying the related pairs of selection criteria comprises:
   for each of the pairs of selection criteria:
      determining for each of the pairs of selection criteria a measure of vector similarity between a first topic vector for a first selection criteria in the pair and a second topic vector for a second selection criteria is the pair, the topic vector for each selection criteria specifying the topic clusters to which the selection criteria was assigned; and
      selecting, as the related pairs of selection criteria, the pairs of selection criteria for which the measure of vector similarity meets a threshold vector similarity.

16. The computer storage device of claim 13, wherein the instructions cause the data processing apparatus to perform operations comprising selecting a name for the group based on one or more topic clusters to which the related pairs in the new keyword cluster were assigned.

17. The computer storage device of claim 13, wherein creating a new keyword cluster based on the related pairs comprises creating a new keyword cluster that is exclusive of pairs of selection criteria having measures of similarity that failed to meet the threshold.

* * * * *